United States Patent
Cheon et al.

(10) Patent No.: US 9,288,532 B2
(45) Date of Patent: Mar. 15, 2016

(54) METHOD AND APPARATUS FOR COLLECTING CONTENT

(75) Inventors: Ka-won Cheon, Seoul (KR);
Choon-kyoung Moon, Yongin-si (KR);
Seong-hoon Kang, Suwon-si (KR);
Hyung-jin Seo, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 383 days.

(21) Appl. No.: 13/343,552

(22) Filed: Jan. 4, 2012

(65) Prior Publication Data

US 2012/0177292 A1    Jul. 12, 2012

(30) Foreign Application Priority Data

Jan. 7, 2011    (KR) ........................ 10-2011-0001794

(51) Int. Cl.
| | |
|---|---|
| G06K 9/46 | (2006.01) |
| G06K 9/66 | (2006.01) |
| H04N 21/436 | (2011.01) |
| G06F 17/30 | (2006.01) |
| H04N 21/41 | (2011.01) |
| H04N 21/482 | (2011.01) |
| H04N 21/84 | (2011.01) |

(52) U.S. Cl.
CPC .... *H04N 21/43615* (2013.01); *G06F 17/30026* (2013.01); *G06F 17/30047* (2013.01); *H04N 21/4126* (2013.01); *H04N 21/4135* (2013.01); *H04N 21/43622* (2013.01); *H04N 21/4828* (2013.01); *H04N 21/84* (2013.01)

(58) Field of Classification Search
CPC ..... H04W 4/008; H04W 84/18; H04W 88/06; H04W 8/005; H04W 4/023; H04W 8/205
USPC ........................................... 382/190
See application file for complete search history.

(56) References Cited

U.S. PATENT DOCUMENTS

| | | | |
|---|---|---|---|
| 7,607,582 B2 | 10/2009 | Vallabh et al. | |
| 8,144,944 B2* | 3/2012 | Ishii | 382/118 |
| 8,724,004 B2* | 5/2014 | Song et al. | 348/333.12 |
| 2004/0109063 A1* | 6/2004 | Kusaka et al. | 348/207.1 |
| 2004/0230599 A1 | 11/2004 | Moore et al. | |
| 2005/0278375 A1* | 12/2005 | Mitchko et al. | 707/104.1 |
| 2008/0059526 A1 | 3/2008 | Murakoshi | |

(Continued)

FOREIGN PATENT DOCUMENTS

| | | |
|---|---|---|
| CN | 101277239 | 10/2008 |
| EP | 1 976 194 | 10/2008 |

(Continued)

OTHER PUBLICATIONS

European Search Report dated Sep. 1, 2015 issued in counterpart application No. 12731978.8-1905, 6 pages.

(Continued)

*Primary Examiner* — John Strege (74) *Attorney, Agent, or Firm* — The Farrell Law Firm, P.C.

(57) ABSTRACT

A method of collecting content by a content-collecting apparatus is provided. The method includes extracting a characteristic information from content that is being displayed; transmitting the extracted characteristic information to an external device; and receiving content relating to the transmitted characteristic information from the external device.

18 Claims, 9 Drawing Sheets

(56) References Cited

U.S. PATENT DOCUMENTS

| | | | |
|---|---|---|---|
| 2008/0226119 A1* | 9/2008 | Candelore et al. | 382/100 |
| 2008/0244066 A1 | 10/2008 | Yoshida et al. | |
| 2008/0256488 A1 | 10/2008 | Van De Sluis et al. | |
| 2009/0046954 A1 | 2/2009 | Ishii | |
| 2009/0115852 A1 | 5/2009 | Jung et al. | |
| 2010/0015919 A1* | 1/2010 | Tian | 455/41.2 |
| 2010/0082725 A1 | 4/2010 | Onishi | |
| 2010/0131548 A1 | 5/2010 | Moon et al. | |
| 2011/0316790 A1* | 12/2011 | Ollila et al. | 345/173 |

FOREIGN PATENT DOCUMENTS

| | | |
|---|---|---|
| JP | 2000-286843 | 10/2000 |
| JP | 2008-061120 | 3/2008 |
| JP | 2009-003637 | 1/2009 |
| JP | 2009-510584 | 3/2009 |
| JP | 4292954 | 4/2009 |
| JP | 2009-211156 | 9/2009 |
| JP | 2010-081321 | 4/2010 |
| KR | 1020090002225 | 1/2009 |
| KR | 1020100024370 | 3/2010 |
| KR | 1020100038344 | 4/2010 |
| KR | 1020100057729 | 6/2010 |
| KR | 1020100058302 | 6/2010 |
| WO | WO 2007/036832 | 4/2007 |

OTHER PUBLICATIONS

Chinese Office Action dated Nov. 30, 2015 issued in counterpart application No. 201280004759.6, 16 pages.

Japanese Office Action dated Dec. 14, 2015 issued in counterpart application No. 2013-548348, 7 pages.

* cited by examiner

METHOD AND APPARATUS FOR COLLECTING CONTENT

PRIORITY

This application claims priority under 35 U.S.C. §119(a) to Patent Application No. 10-2011-0001794, filed on Jan. 7, 2011 in the Korean Intellectual Property Office, the entire disclosure of which is incorporated herein by reference.

BACKGROUND OF THE INVENTION

1. Field of the Invention

The present invention generally relates to a method and apparatus for collecting content, and more particularly, content-collecting apparatus wherein a device that is adjacent to the content-collecting apparatus is recognized and connected to the content-collecting apparatus and characteristics are extracted from the content based on characteristics and usage situations of the content that is being executed by a user of the device and the content relating to the characteristics is collected from the device that is connected to the content-collecting apparatus.

2. Description of the Related Art

A variety of content-creating devices have been made, and the variety and amount of produced content have been gradually increasing. When content that is created at the same event and stored in different devices needs to be managed, all of the content is stored in one place to make its management simpler. A user may then access desired content by using a viewer or gathers the desired content by searching for it, and classifies the desired content by creating a folder of a desired name and by storing the content in the folder. When content of the same event is stored in different devices, if an step of managing and collecting the content is completed in one device, another device must be connected to the device of which the step of managing and collecting the content has been completed, so as to perform a series of steps repeatedly. In particular, when there is no space to store much of the content at one time, that is, when there is no Information Technology (IT) device with a large enough capacity, such as a Personal Computer (PC), the user is inconvenienced. For example, the same image file may be stored in duplicate in different folders or may not be easily stored in a specific folder. When a user cannot remember the location where desired content is stored, the desired content cannot be found, or it takes long time to find the desired content, a user is inconvenienced. Thus, there is a need for a method of collecting content where the user can gather a desired content easily based on the user or content.

SUMMARY OF THE INVENTION

The present invention provides a method and content-collecting apparatus wherein a device that is adjacent to the content-collecting apparatus is recognized and connected to the content-collecting apparatus and characteristics are extracted from the content based on characteristics and usage situations of the content that is being executed by a user of the device and the content relating to the characteristics is collected from the device that is connected to the content-collecting apparatus.

According to an aspect of the present invention, a method of collecting content by a content-collecting apparatus is provided. The method includes extracting a characteristic information from content that is being displayed; transmitting the extracted characteristic information to an external device; and receiving content relating to the transmitted characteristic information from the external device. According to another embodiment of the present invention, a content-collecting apparatus is provided. The apparatus includes a controller for extracting a characteristic information from content that is being displayed; and a communication unit for transmitting the extracted characteristic information to an external device and receiving content relating to transmitted characteristic information from the external device.

BRIEF DESCRIPTION OF THE DRAWINGS

The above and other aspects, features and advantages of the present invention will become more apparent by describing in detail embodiments thereof with reference to the attached drawings in which.

DETAILED DESCRIPTION OF EMBODIMENTS OF THE PRESENT INVENTION

The present invention will now be described more fully with reference to the accompanying drawings, in which embodiments of the invention are shown.

Figure 1:
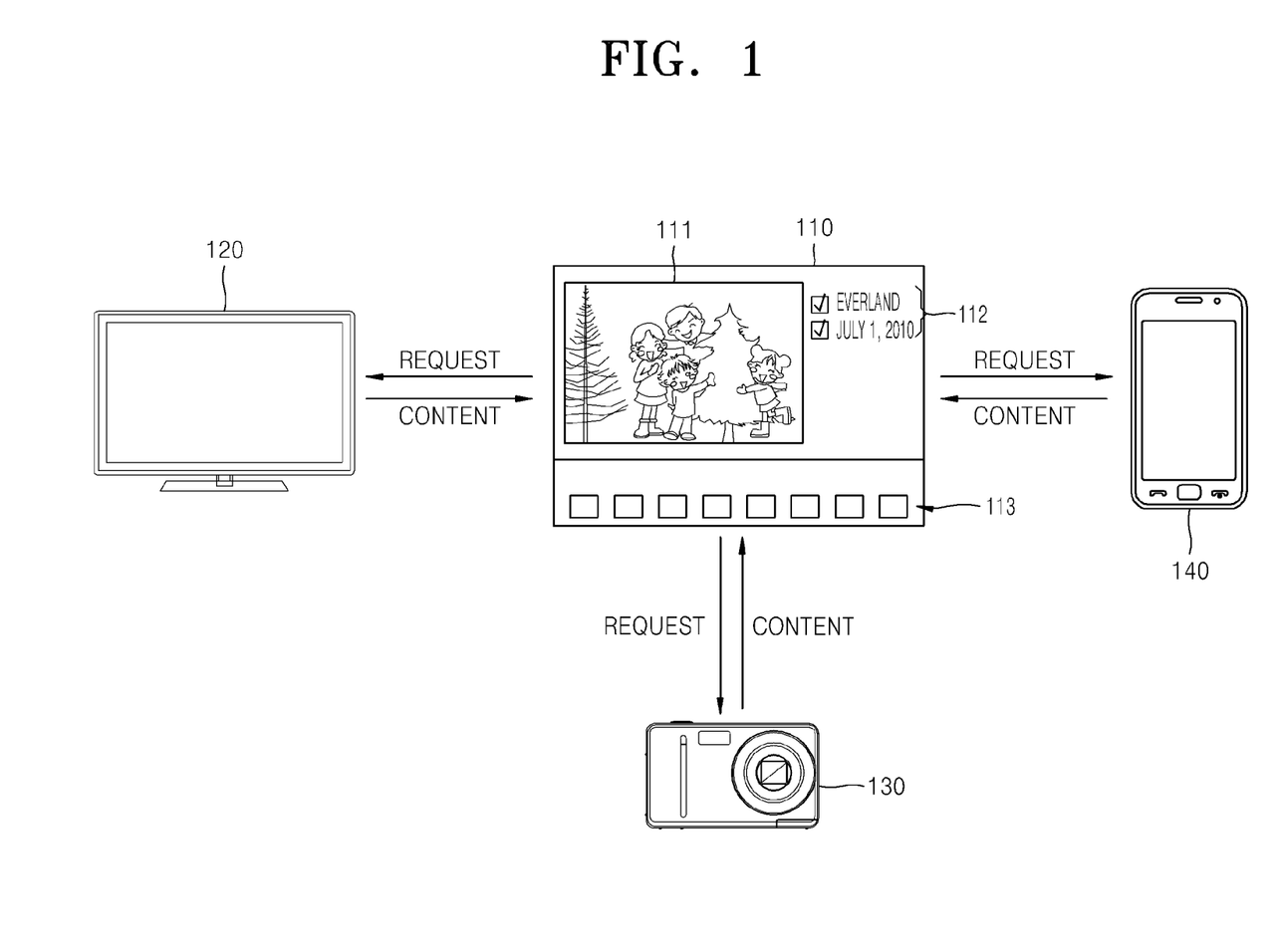
FIG. 1 is a block diagram illustrating a system for collecting content, according to an embodiment of the present invention.

FIG. 1 is a block diagram illustrating a system for collecting content, according to an embodiment of the present invention.

Referring to FIG. 1, the system for collecting content includes an content-collecting apparatus 110 and apparatuses 120, 130 and 140 for providing content. The content-collecting apparatus 110 and the apparatuses 120, 130, and 140 for providing content are connected to one another via a network. In FIG. 1, the apparatuses 120, 130, and 140 for providing content may be a TV 120, a camera 130, and a mobile device 140. However, the present invention is not limited thereto, and the apparatuses 120, 130, and 140 for providing content may be other types of apparatuses that can connect to the content-collecting apparatus 110 and may provide the content.

The content-collecting apparatus 110 recognizes the apparatuses 120, 130, and 140 for providing content that are in a recognizable range via the predetermined network and is connected thereto. The network may be a wireless protocol network, such as ZigBee®, Wireless Fidelity (Wi-Fi), Bluetooth®, IEEE 802.11, Home Radio Frequency (RF), Infrared Data Association (IrDA), Ultra WireBand (UWB), Near Field Communication (NFC), Radio Frequency IDentification (RFID) or Wireless 1394, or a wired protocol-based network, such as Ethernet, Home Phoneline Networking Alliance (PNA), Power Line Communication (PLC), IEEE 1394 or Universal Serial Bus (USB). In the current embodiment, when the content-collecting apparatus 110 recognizes the apparatuses 120, 130, and 140 for providing content, the apparatus 110 may recognize the apparatuses 120, 130, and 140 via a ZigBee® or Bluetooth® network, and when the content-collecting apparatus 110 is connected to the apparatuses 120, 130, and 140 for providing content, the apparatus 110 may be connected to the apparatuses 120, 130, and 140 via a Wi-Fi network.

The content-collecting apparatus 110 extracts characteristics 112 of the apparatuses 120, 130, and 140 for providing content based on characteristics and usage situations of content 111 that is being executed, i.e., is being displayed, transmits the extracted characteristics 112 to the apparatuses 120, 130, and 140 for providing content that can connect to the content-collecting apparatus 110, thereby requesting content relating to the characteristics 112.

The apparatuses 120, 130, and 140 for providing content then transmit the content relating to the characteristics 112 to the content-collecting apparatus 110 based on received information regarding the characteristics 112. The content-collecting apparatus 110 displays received content 113. According to another embodiment, the apparatuses 120, 130, and 140 transmit content information relating to the content 111 based on the received characteristics 112. The content information may include at least one of the group consisting of a thumbnail of the content, address information regarding the content, such as a folder name in which a device and content are stored, and a filename of the content. The content-collecting apparatus 110 then receives and displays the received content 113. When the user selects content, the content-collecting apparatus 110 requests the selected content from the apparatuses 120, 130, and 140 and receives the requested content from the apparatuses 120, 130, and 140. The received content may be reproduced or stored according to a user's selection.

Figure 2:
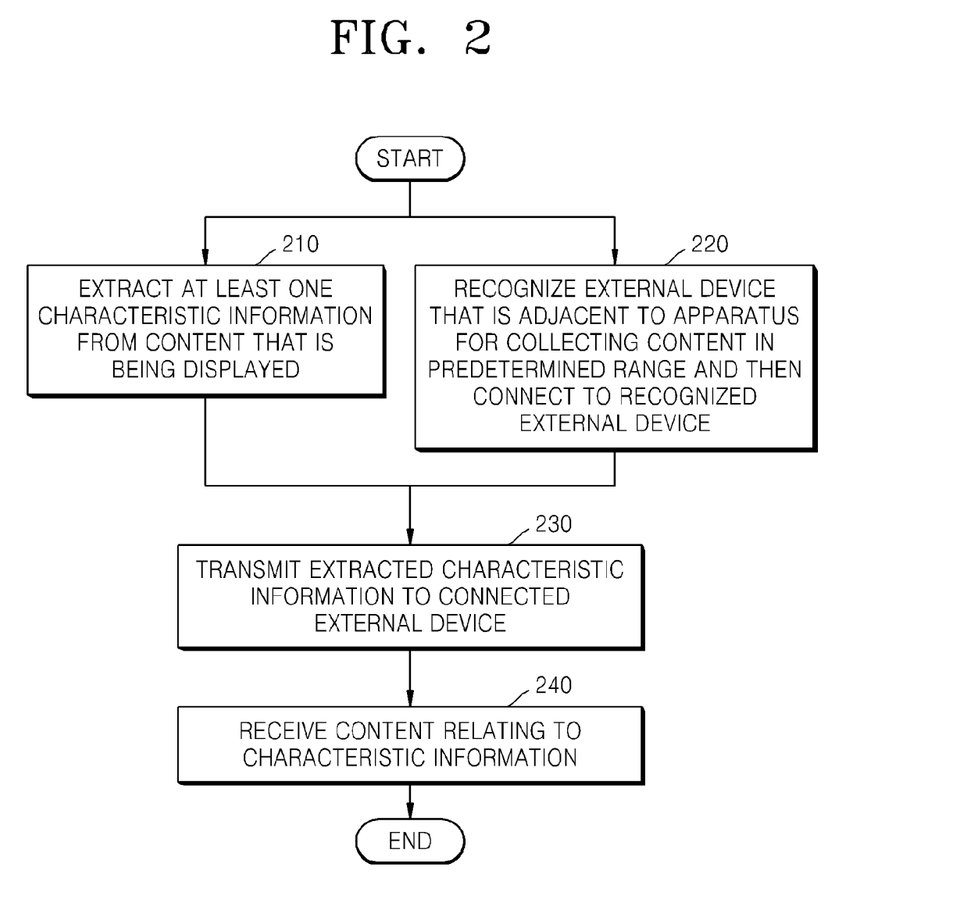
FIG. 2 is a flowchart illustrating a method of collecting content, according to an embodiment of the present invention.

FIG. 2 is a flowchart illustrating a method of collecting content, according to an embodiment of the present invention.

Referring to FIG. 2, in step 210, a content-collecting apparatus extracts at least one characteristic information from content that is being displayed. In the current embodiment, a method of extracting at least one characteristic information from content that is being displayed may be a method of extracting characteristic information from content that is being displayed according to predetermined conditions, a method of extracting characteristic information from content that is being displayed according to a current content mode, and a method of extracting characteristic information from content that is being displayed based on a property of the current content. Since extracted characteristic information regarding a device including the content-collecting apparatus 110 is different based on a situation of content that is being displayed on the device including the content-collecting apparatus 110, the result of collecting the content may be modified.

In the method of extracting characteristic information from content that is being displayed according to predetermined conditions, the user sets predetermined conditions, for example, a date at which content is created, a location where content is stored, and the like, previously, and the content-collecting apparatus creates characteristic information according to the set conditions. For example, when the user sets a condition of a date at which content is created, previously, the content-collecting apparatus may extract characteristic information of Dec. 25, 2010 and may request for content relating to the characteristic information to an apparatus for providing content.

In the method of extracting characteristic information from content that is being displayed according to a current content mode, the characteristic information is extracted according to the type of content that is being displayed, for example, a photo, a video, news, and a television channel. For example, when the content that is being displayed is a photo, the content-collecting apparatus may extract the characteristic information of "photo" and may request for content relating to the photo to the apparatus for providing content. Alternatively, when a current content list, for example, a photo list, a music list, a video list, and the like, is being displayed, the characteristic information may be extracted according to the state of content, i.e., a mode regarding usage of the content. For example, when the current photo list is displayed, the content-collecting apparatus may extract the characteristic information of "photo" and may request for content relating to the photo at the apparatus for providing content.

In the method of extracting characteristic information from content that is being displayed based on a property of the current content, the characteristic information is extracted by analyzing information included in content that is being displayed. For example, when the content that is being displayed is a photo, date and time, a location, a person, an event, a theme, a feature, a usage mode, information (including color information) that is extracted from an image, and metadata and tag information of a file may be the characteristic information. The content-collecting apparatus may extract the information that is included in the photo, may transmit the extracted information to the apparatus for providing content and may receive a related photo. The methods of extracting characteristic information disclosed as examples may be used separately or in combination with one another.

In the current embodiment, the content may include at least one of a photo, music, a video, news information, TV program information, a user's schedule, a user's address book, and information regarding the setting state of a device including the content-collecting apparatus.

When the content is a photo, extractable characteristic information may be theme and event (for example, family trip, summer vacation) information that is extracted from an image, time information, location information using Global Positioning System (GPS) information, person information using face information that may be extracted from a photo image, and device information, such as a camera manufacturer or model name. That is, all tag information that is provided from a photo image may be used as characteristic information. A current image tag is data of an Exchangeable Image File Format and may used in Joint Photographic Experts Group (JPEG) and Tagged Image File Format (TIFF) files, and the current image tag includes information about a camera manufacturer, a camera model, a firmware version, a time of photographing, a storage time, latitude and longitude of a photographing location, a name of photographer, a shutter speed, a focal length, an F-number, an exposure correction value, a photographing program, a metering mode, white balance, a BW reference value, resolution, size, orientation, a file compression method, an image name, and copyright holder information.

When the content is music, extractable characteristic information may be information regarding titles, album names, artist names, genre, songwriters, and a release date included in music content. Tag (audio tag) information that is provided from the current music content is an ID3 tag, which is metadata of an MP3 file. The ID3 tag may include information regarding a title, an artist name, an album name, a release year, genre, a song number, songwriter, a conductor, the type of medium, lyrics, an image, and a file size.

When the content is a video, extractable characteristic information may be image information, such as titles, time, genre, reproduction time, file sizes, manufacturing tools, frame speed, compression codec, and representative images (for example, a poster in the case of a movie).

When the content is news information, extractable characteristic information may be a representative keyword and a representative image (for example, a person) that are provided as a news text, image information, or the like.

When the content is TV program information, extractable characteristic information may be all information regarding programs that are broadcasted and may be program names, time, host name, cast members, and genre.

When the content is a user's schedule, extractable characteristic information may be predetermined information that is created by a user or is registered by data interworking, such as time, event content, repetition, and the like.

When the content is a user's addressbook, extractable characteristic information may be information that is input by the user or is registered in an automatically-updated telephone book, such as names, telephone numbers, groups, e-mails, addresses, and memos.

When the content is information regarding the setting state of a device including the content-collecting apparatus, extractable characteristic information may be network setting information, such as Internet Protocol (IP) or Media Access Control (MAC) addresses, usage language information, application information, wallpaper, and personal setting information.

When the characteristic information is extracted, the content-collecting apparatus displays the characteristic information. The content-collecting apparatus may provide an interface in which at least one displayed characteristic information may be selected by the user.

In step 220, the content-collecting apparatus recognizes an external device that is adjacent to the content-collecting apparatus in a predetermined range and then connects to the recognized external device. In the current embodiment, the content-collecting apparatus may recognize the external device via a ZigBee® or Bluetooth® network, and when the content-collecting apparatus is connected to the apparatus for providing content, the content-collecting apparatus may be connected thereto via a Wi-Fi network. Obviously, the content-collecting apparatus may recognize and may be connected to the apparatus for providing content via one network. In the current embodiment, proximity is required. However, the present invention is not limited thereto, and there may be various recognition or connection ranges based on a situation of a network or device. In addition, a recognition and connection state of the apparatus for providing content may be displayed on the content-collecting apparatus. The state of connected devices may be displayed in the form of an icon. In addition, device recognition (deletion/addition), device connection (connection/disconnection) state may be set according to a user's intention. For example, search operators (and/or/not) may be set according to devices, and the user may set to include "and/or/not" when searching for desired content. Additionally, devices that have been previously connected to one another may be automatically connected to one another, and when the devices exist on the same network, they may be adjacent to one another and may be recognized and, even when a distance between the devices increases, the devices may be continuously recognized. Step 220 and step 210 may be performed in parallel, or steps 210 and 220 may be performed sequentially. Of course, when steps 210 and 220 are performed sequentially, they may be performed in the reverse order.

In step 230, the content-collecting apparatus transmits the extracted characteristic information to the external device that is connected to the content-collecting apparatus. When at least one extracted characteristic information is displayed on the external device, the user may select at least one extracted characteristic information and may transmit the selected extracted characteristic information to the external device. The content-collecting apparatus may transmit the selected characteristic information to the external device in a metadata format.

In step 240, the content-collecting apparatus receives content relating to the characteristic information from the external device. When the external device receives the characteristic information from the content-collecting apparatus and is requested to provide content, the external device extracts content relating to the received characteristic information and transmits the extracted content to the content-collecting apparatus. A condition by which a device functions as the external device may include cases where power of the device is turned on (also applies to the case where power is turned off according to a user's intention), the device is connected to the content-collecting apparatus via a network, data transmission and sharing of the device have already been authorized, and software only for performing methods relating to the above cases is installed, for example.

Figure 3:
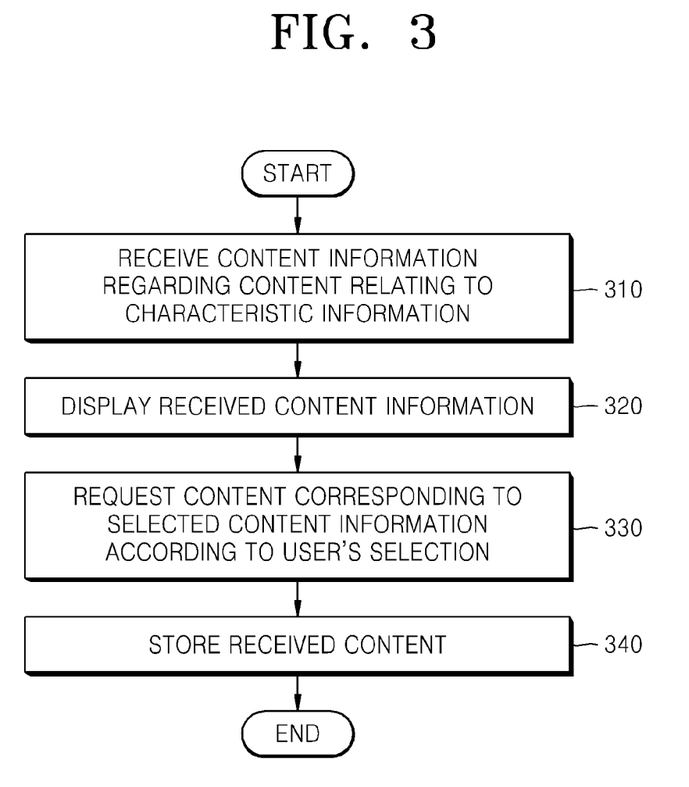
FIG. 3 is a flowchart illustrating step 240 of the method of collecting content illustrated in FIG. 2, according to an embodiment of the present invention.

FIG. 3 is a flowchart illustrating step 240 of the method of collecting content illustrated of FIG. 2, according to an embodiment of the present invention.

Referring to FIG. 3, in step 310, the content-collecting apparatus receives content information relating to characteristic information. In the current embodiment, the content information may include at least one of the group consisting of a thumbnail of the content, address information regarding the content, such as a folder name in which a device and content are stored, and a filename of the content, and the like.

In step 320, the content-collecting apparatus displays the received content information. Additionally, the content-collecting apparatus may display all or selected content according to the type of the received content, for example, a photo, music, a video, news, a TV channel, or the like.

In step 330, the content-collecting apparatus requests for content corresponding to content information selected according to a selection of a user to an external device. For example, when a user selects content information displayed on a screen of the apparatus and moves the selected content information to a desired device displayed on the screen (for example, drag and drop), the content-collecting apparatus requests for content corresponding to the selected content information to the device.

In step 340, the content-collecting apparatus may receive the requested content and may store the content in a device or location that is selected by the user.

When the steps illustrated in FIGS. 2 and 3 are performed and the user modifies the content that is being displayed in the state where the content is collected, steps of FIGS. 2 and 3 are performed again, and the content relating to the characteristics may be collected in real-time when the content is modified.

Figure 4:
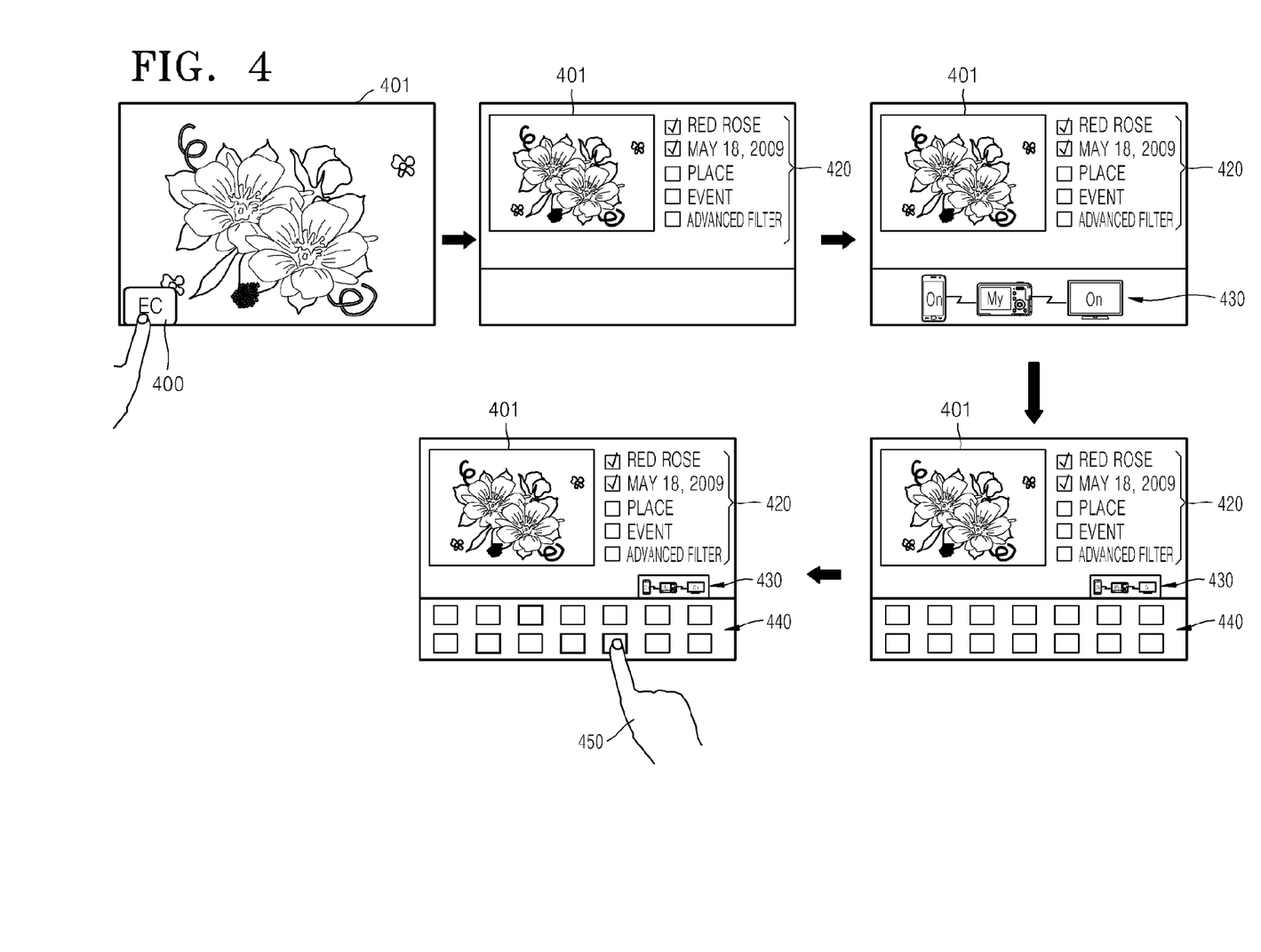
FIG. 4 illustrates a method of collecting content illustrated in FIGS. 2 and 3.

FIG. 4 illustrates an example of the method of collecting content of FIGS. 2 and 3.

Referring to FIG. 4, when the current content, in FIG. 4, an image 401, is being displayed, an Easy Collecting (EC) button 400 is activated. When the EC button 400 is activated, an application (software) relating to the method of collecting content is executed. The content-collecting apparatus then extracts characteristic information from the image 401 that is being displayed. The characteristic information is extracted using the method illustrated in FIG. 2. The content-collecting apparatus displays extracted characteristic information 420. The displayed characteristic information 420 has an interface that may be selected by the user. Before, after, or simultaneously with displaying of the extracted characteristic information 420, the content-collecting apparatus searches for external devices that are adjacent to the content-collecting apparatus and connects to one of the found external devices according to a selection of a user or automatically. Further, the external device that is connected to the content-collecting apparatus and the content-collecting apparatus are displayed (430) on a screen. The content-collecting apparatus then transmits the characteristic information that is selected by the user (in FIG. 4, information regarding red rose and time information relating to May 18, 2009) to the connected external device. The external device extracts content information relating to the received characteristic information based on the received characteristic information 420 and transmits the extracted content information 420 to the content-collecting apparatus. Since the content that is being displayed is an image, the external device has to search for and transmit the image; however, the present invention is not limited thereto. That is, the external device extracts the information regarding red rose and/or the time information relating to May 18, 2009, and transmits them to the content-collecting apparatus. The content information is as described with reference to FIG. 2. The content-collecting apparatus displays content information 440 that is received from the external device. When a user 450 selects some content information, the user 450 may then request for content corresponding to the selected content information 440 to the external device, may receive the content, and then may reproduce or store the content.

Hereinafter, each of the scenarios relating to a method of collecting content, according to embodiments of the present invention, will be described.

Figure 5:
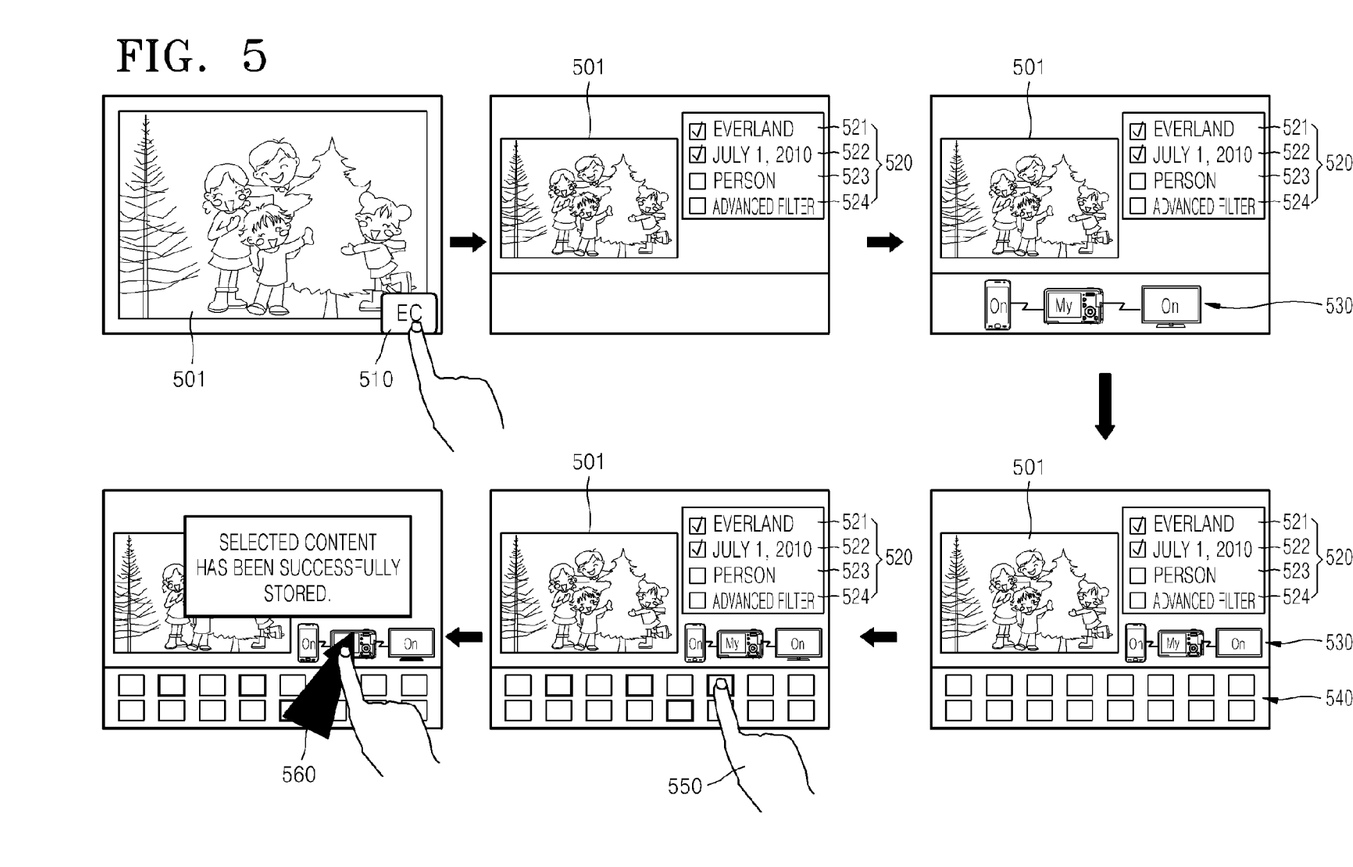
FIG. 5 illustrates a method of collecting content, according to an embodiment of the present invention.

FIG. 5 illustrates an example of a scenario relating to a method of collecting content, according to an embodiment of the present invention.

Referring to FIG. 5, when an image 501 is being displayed, an EC button 510 is activated. When the EC button 510 is activated, an application (software) relating to the method of collecting content is executed. Next, the content-collecting apparatus extracts characteristic information 520 from the image 501 that is being displayed. The characteristic information 520 is extracted by using the method illustrated in FIG. 2. In the content-collecting apparatus, the image 501 that is being displayed is determined as a selected image, and the characteristic information 520 including date, location, person, and the like may be displayed. These situations may be conditions for searching for content that is similar to a user's desired content. Information relating to date and event may be extracted from a user schedule information. The content-collecting apparatus displays the extracted characteristic information 520. In this case, the displayed characteristic information 520 have an interface that may be selected by the user. After, before, or simultaneously with displaying of the extracted characteristic information 520, the content-collecting apparatus searches for external devices that are adjacent to the content-collecting apparatus and is connected to at least one of the found external devices according to a selection of a user or automatically. In addition, the external device that is connected to the content-collecting apparatus and the content-collecting apparatus are displayed (530) on a screen. Next, the content-collecting apparatus transmits the characteristic information that are selected by the user (in FIG. 5, information 521 regarding Everland and time information 522 relating to Jul. 1, 2010) to the connected external device. The external device extracts content information relating to the received characteristic information based on the received characteristic information 520 and transmits the extracted content information to the content-collecting apparatus. The content information is as described with reference to FIG. 2. The content-collecting apparatus displays content information 540 that is received from the external device. In this case, the content-collecting apparatus may allocate a proper color to each of the external devices and may display a proper color corresponding to an external portion of the content so as to recognize which external device receives the content. Next, when a user 550 selects arbitrary content information, the user 550 may request for content corresponding to the selected content information to the external device, may receive the content, and then may reproduce or store it. For example, when the user 550 selects an image of arbitrary content information and moves the selected image to an image (560) of an external device, for example, drag and drop, the content-collecting apparatus may request for content corresponding to the selected image of the content information to the external device, may receive the requested content, and may then reproduce or store it. When the content is a video, the content-collecting apparatus may also play the content.

Figure 6:
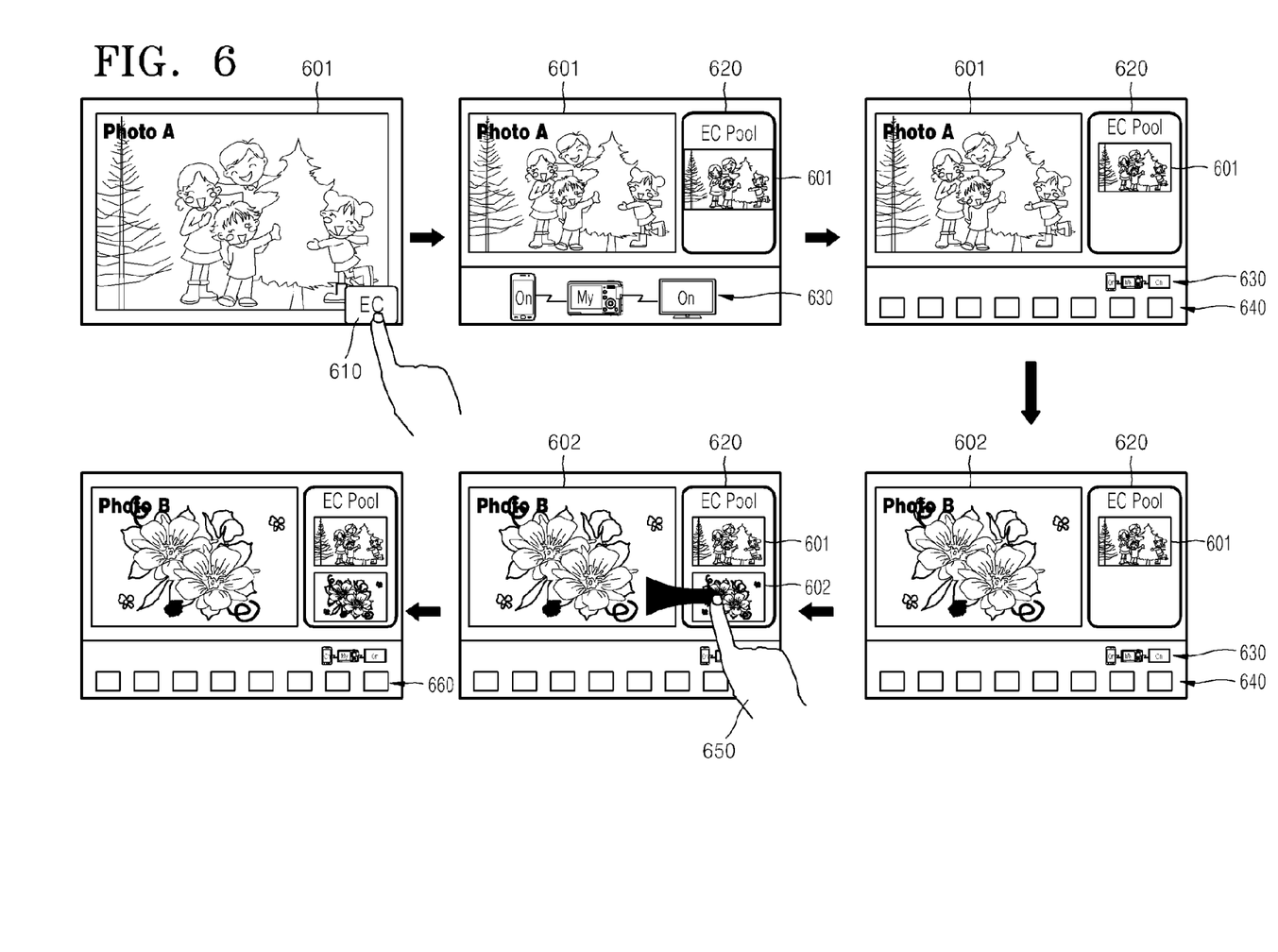
FIGS. 6 to 8 illustrate a method of collecting content, according to another embodiments of the present invention.

FIG. 6 illustrates a method of collecting content, according to another embodiment of the present invention.

Referring to FIG. 6, when a first image 601 is being displayed, an EC button 610 is activated. When the EC button 610 is activated, an application (software) relating to the method of collecting content is executed. The content-collecting apparatus then displays the first image 601 in another region 620 that is referred to as an EC pool 620. The content-collecting apparatus then extracts characteristic information from the first image 601 that is being displayed. The characteristic information is extracted by using the method illustrated in FIG. 2. Although not shown, the extracted characteristic information may be displayed. After or simultaneously with displaying of the extracted characteristic information, the content-collecting apparatus searches for external devices that are adjacent to the content-collecting apparatus and is connected to at least one of the found external devices according to a selection of a user or automatically. Moreover, the external device 630 that is connected to the content-collecting apparatus and the content-collecting apparatus are displayed on a screen. The content-collecting apparatus then transmits the extracted characteristic information to the connected external device. The external device extracts content information relating to the received characteristic information based on the received characteristic information and transmits the extracted content information to the content-collecting apparatus.

The content information is the same as described with reference to FIG. 2. The content-collecting apparatus displays content information 640 that is received from the external device. In this case, the content-collecting apparatus may allocate a proper color to each of the external devices and may display a proper color corresponding to an external portion of the content so as to recognize which external device receives the content. When a user 650 executes, i.e., displays, a second image 602 so as to add another image to the first image 601, the second image 602 is displayed on the EC pool 620, and characteristic information is extracted from the second image 602, is transmitted to the external device, and the content-collecting apparatus receives and displays content information relating to the characteristic information regarding the second image 602. Content information 660 relating to the first image 601 and the second image 602 is displayed, i.e., only common content information or all received content information may be displayed.

Figure 7:
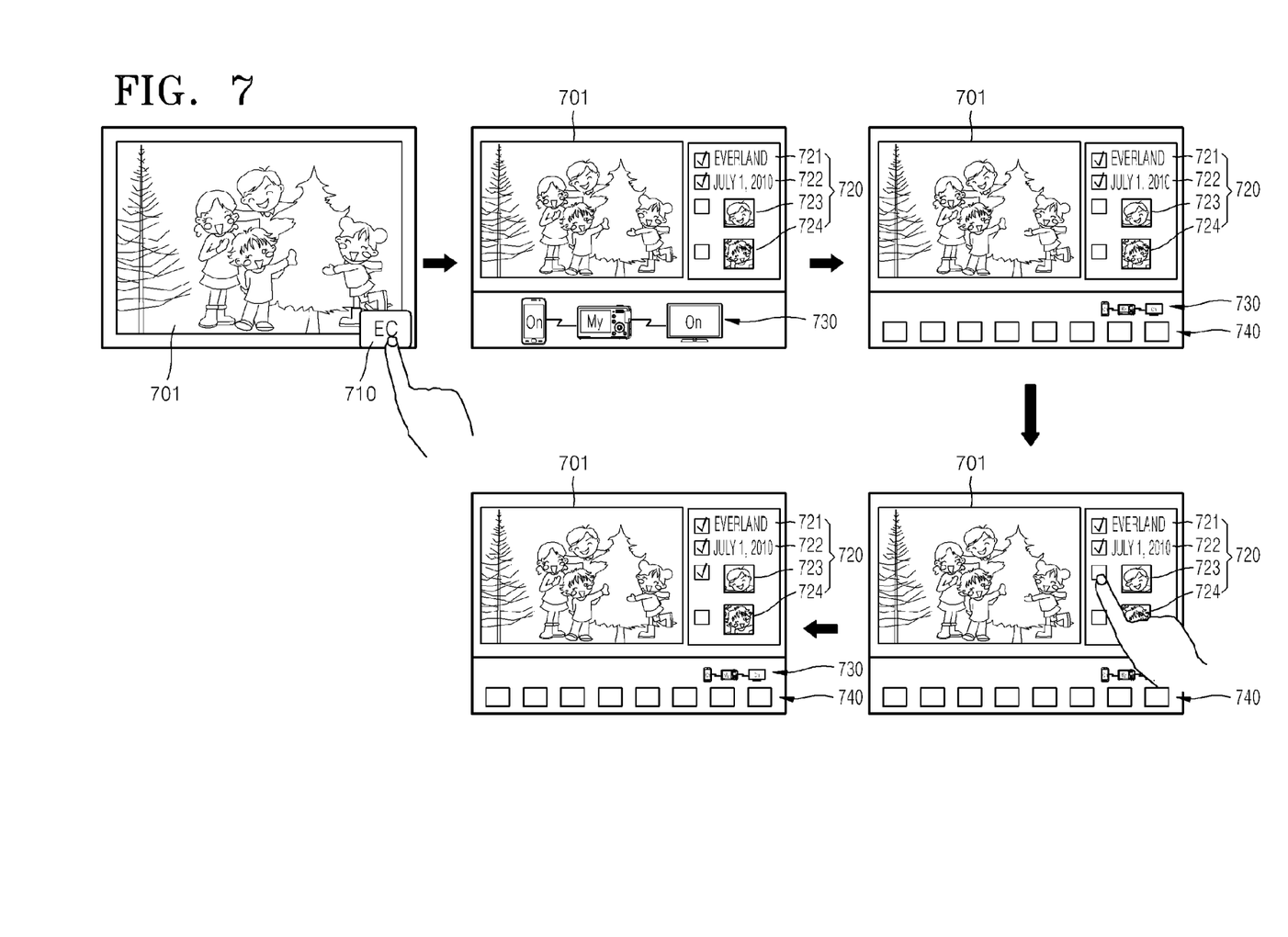

FIG. 7 illustrates a method of collecting content, according to another embodiment of the present invention.

Referring to FIG. 7, when an image 701 is being displayed, an EC button 710 is activated. When the EC button 710 is activated, an application (software) relating to the method of collecting content is executed. The content-collecting apparatus then extracts characteristic information 720 from the image 701 that is being displayed. The characteristic information 720 is extracted by using the method illustrated in FIG. 2. The content-collecting apparatus displays the extracted characteristic information 720. In this case, the displayed characteristic information 720 has an interface that may be selected by the user. After or simultaneously with displaying of the extracted characteristic information 720, the content-collecting apparatus searches for external devices that are adjacent to the content-collecting apparatus and is connected to at least one of the found external devices according to a selection of a user or automatically. Additionally, the external device 730 that is connected to the content-collecting apparatus and the content-collecting apparatus are displayed on a screen. The content-collecting apparatus then transmits the characteristic information that is selected by the user (in FIG. 7, information 721 regarding the theme park Everland and time information 722 relating to Jul. 1, 2010) to the connected external device. The external device extracts content information relating to the received characteristic information based on the received characteristic information 520 and transmits the extracted content information to the content-collecting apparatus. The content information is as described with reference to FIG. 2. The content-collecting apparatus displays content information 740 that is received from the external device. The content-collecting apparatus may allocate a proper color to each of the external devices and may display a proper color corresponding to an external portion of the content so as to recognize which external device receives the content. The user may further search for content that exists in the external device by adding the extracted characteristic information to the existing, received content information. When the user further selects characteristic information regarding a person 723, the content-collecting apparatus may transmit characteristic information regarding Everland information 721, the time information 722 relating to Jul. 1, 2010, and the person information 723 to the connected external device, may further receive content information 750 relating to the characteristic information and may display them. When the user further adds the characteristic information to the existing, received content information, the characteristic information may be limited to content information relating to the characteristic information that are further added to the existing, received content information. The external device extracts content including a selected person by performing a predetermined image analysis of the selected person.

Figure 8:
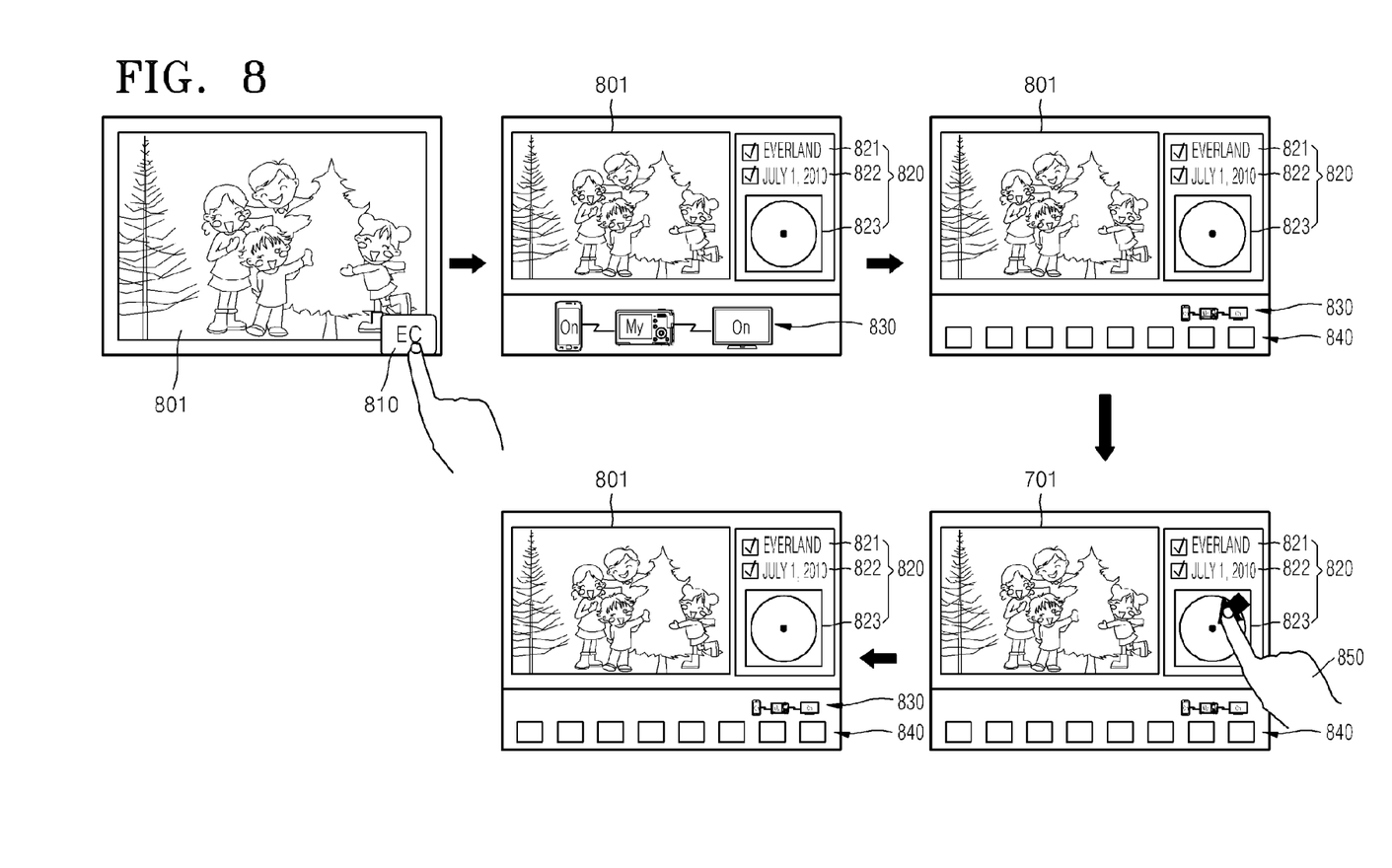

FIG. 8 illustrates a method of collecting content, according to another embodiment of the present invention.

Referring to FIG. 8, when compared with FIG. 7, additionally-selected characteristic information is modified into GPS information 823. An external device extracts content in a range that is defined based on the selected GPS information 823 and transmits the extracted content to a content-collecting apparatus.

FIGS. 5 to 8 illustrate a method of collecting content relating to an image. However, the present invention is not limited thereto, and the method of collecting content may be applied to all types of content that are exemplified in the present specification.

In another embodiment a method of collecting content in the case where the type of content is a schedule of a user will be described below. In this regard, content (for example, a photo or video) relating to date, location, event, and person name that are made in a schedule that is being managed by the user may be collected and may constitute a group (album) according to events.

Additionally, in another embodiment, when the type of content is music, preferred music that is stored in an external device may be received by the content-collecting apparatus. Further, a playlist of the music may be automatically created by the apparatus according to a predetermined priority. Further, the music may be shared with another person and may be played by the apparatus based on another person's music preference.

In another embodiment, when current content is not being displayed but a file browser is being displayed, the content-collecting apparatus extracts a common point by analyzing content of a list, extracts a proper value from the common point and provides the proper value as situation information. The external device provides the result of analyzing the highlighted content of the list. As a result, all content may be collected regardless of the types of the content.

In another embodiment, when the content is particular personal information regarding a device and device menu information, such as a setting menu screen or the like, information that may be used as situation information in a current state are analyzed and provided. The content-collecting apparatus provides a list of connected devices to an external device. When the user selects a device of which a setting state is to be shared, the content-collecting apparatus shares setting information with connected devices, i.e., synchronizes a setting situation with the connected devices.

Figure 9:
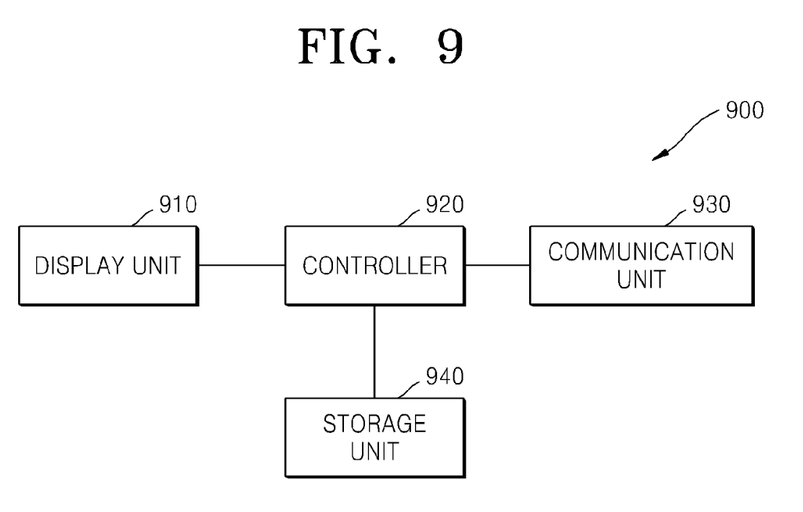
FIG. 9 is a block diagram of a content-collecting apparatus, according to an embodiment of the present invention.

FIG. 9 is a block diagram of an apparatus 900 for collecting content, according to an embodiment of the present invention.

Referring to FIG. 9, the apparatus 900 for collecting content includes a display unit 910, a controller 920, a communication unit 930, and a storage unit 940. The apparatus 900 for collecting content may be an apparatus for providing a function of managing and reproducing content. For example, the apparatus 900 for collecting content may be a Consumer Electronic (CE) product, such as a TV, a PC, a desktop PC, a laptop PC, a tabletop, a smart board, a touch remote control, a tablet, a digital camera, a digital photo frame, a mobile phone, a mobile device, or the like.

The display unit 910 displays the content, a device connection state, collected content information or content that will be described below.

The communication unit 930 recognizes an external device that is in a predetermined recognizable range, i.e., an apparatus for providing content (not shown), via a predetermined network and is connected to the apparatus for providing content (not shown). The predetermined network may be a wireless protocol network, such as ZigBee®, Wi-Fi, Bluetooth®, IEEE 802.11, RF, IrDA, UWB, NFC, RFID or Wireless 1394, or a wired protocol-based network, such as Ethernet, PNA, PLC, IEEE 1394 or USB In the current embodiment, when the content-collecting apparatus 110 recognizes the apparatuses 120, 130, and 140 for providing content, it may recognize them via a ZigBee® or a Bluetooth® network, and when the content-collecting apparatus 110 is connected to the apparatuses 120, 130, and 140 for providing content, the apparatus 110 may be connected thereto via a Wi-Fi network. In an embodiment, the communication unit 930 may recognize the external device via a ZigBee® or Bluetooth® network, and when the communication unit 930 is connected to the external device, the communication unit 930 may be connected thereto via a Wi-Fi network. The communication unit 930 may recognize and may be connected to the apparatus for providing content via one network. In the current embodiment, proximity of the devices is relevant. However, the present invention is not limited thereto, and there may be various recognition or connection ranges based on a situation of a network or device.

Moreover, the display unit 910 may display recognition and connection state of the external device. The state of connected devices may be displayed in the form of an icon. Further, device recognition (deletion/addition), device connection (connection/disconnection) state' ay be set according to an intent of a user. For example, "and/or/not" may be set according to devices, and the user may set to include search operators (and/or/not) when searching for desired content. Furthermore, devices that have been previously connected to one another may be automatically connected to one another, and when the devices exist on the same network, they may be adjacent to one another and may be recognized and then, even when a distance between the devices increases, the devices may be continuously recognized.

The controller 920 extracts at least one characteristic information from the content that is being displayed by the display unit 910. In the current embodiment, a method of extracting at least one characteristic information from content that is being displayed may be a method of extracting characteristic information from content that is being displayed according to predetermined conditions, a method of extracting characteristic information from content that is being displayed according to a current content mode, and a method of extracting characteristic information from content that is being displayed according to a property of the current content. Since characteristic information extracted based on the situation of content that is being displayed on the device including the apparatus 900 for collecting content are different, the result of collecting the content may be modified.

In the method of extracting characteristic information from content that is being displayed according to predetermined conditions, the user sets predetermined conditions. For example, the user may set a date at which content is created, a location where content is stored, etc., previously, and the content-collecting apparatus creates characteristic information according to the set conditions. For example, when the user sets a condition of Dec. 25, 2010 previously, the content-collecting apparatus may extract characteristic information of Dec. 25, 2010 and may request for content relating to the characteristic information to an apparatus for providing content.

In the method of extracting characteristic information from content that is being displayed according to a current content mode, the controller 920 extracts the characteristic information according to the type of content that is being displayed by the display unit 910, for example, a photo, a video, news, a television channel. For example, when the content that is being displayed is a photo, the controller 920 may extract the characteristic information of "photo" and may request for content relating to the photo to the apparatus for providing content. Alternatively, when a current content list, for example, a photo list, a music list, a video list, and the like, is being displayed, the controller 920 may extract characteristic information according to the state of content, i.e., a usage mode. For example, when the current photo list is displayed, the controller 920 may extract the characteristic information of "photo" and may request for content relating to the photo to the apparatus for providing content.

In the method of extracting characteristic information from content that is being displayed according to a property of the current content, the controller 920 extracts characteristic information by analyzing information included in the content that is being displayed by the display unit 910. For example, when the content that is being displayed is a photo, date and time, a location, a person, an event, a theme, a feature, a usage mode, information (including color information) that is extracted from an image, and metadata and tag information of a file may be the characteristic information. The controller 920 may extract the information that is included in the above photo, may transmit the extracted information to the apparatus for providing content and may receive a related photo. The methods of extracting characteristic information disclosed as examples may be used separately or in combination.

In the current embodiment, the content may include at least one of a photo, music, a video, news information, TV program information, a schedule of a user, an address book of a user, and information regarding the setting state of a device including the content-collecting apparatus. When the content is a photo, extractable characteristic information may be theme and event (for example, family trip, summer vacation) information that is extracted from an image, time information, location information using GPS information, person information using face information that may be extracted from a photo image, and device information, such as a camera manufacturer or model name. That is, all tag information that is provided from a photo image may be used as characteristic information. A current image tag is an Exchangeable Image File Format (Exit) and is being used in JPEG and TIFF files, and the content of the current image tag includes a camera manufacturer, a camera model, a firmware version, a photographing time, a storage time, latitude and longitude of a photographing location, a photographer, a shutter speed, a focal length, an F-number, an exposure correction value, a photographing program, a metering mode, white balance, a BW reference value, resolution, size, orientation, a file compression method, an image name, and copyright holder information. When the content is music, extractable characteristic information may be information regarding titles, album names, singer names, genre, songwriters, a release date that are included in music content. Tag (audio tag) information that is provided from the current music content is an ID3 tag that is metadata of an MP3 file. The ID3 tag may include information regarding a title, a name of an artist, an album name, a release year, genre, a song number, songwriter, a conducting person, the type of medium, lyrics, an image, and a file size. When the content is a video, extractable characteristic information may be image information, such as titles, time, genre, reproduction time, file sizes, manufacturing tools, frame speed, and compression codec, and representative images (for example, a poster in the case of a movie). When the content is news information, extractable characteristic information may be a representative keyword and a representative image (for example, person) that are provided as a news text, image information, or the like. When the content is TV program information, extractable characteristic information may be all information regarding programs that are broadcasted and may be program names, time, host, cast members, and genre. When the content is a schedule of a user, extractable characteristic information may be all predetermined information that is created by a user or is registered by data interworking, such as time, event content, repetition, and the like. When the content is an address book of a user, extractable characteristic information may be information that is input by the user or is registered in an automatically-updated telephone book, such as names, telephone numbers, groups, e-mails, addresses, and memos. When the content is information regarding the setting state of a device including the content-collecting apparatus, extractable characteristic information may be network setting information, such as IP or MAC addresses, usage language information, application information, wallpaper, and personal setting information.

When the controller 920 extracts the characteristic information, the controller 920 displays the characteristic information by using the display unit 910. The content-collecting apparatus may provide an interface in which at least one displayed characteristic information may be selected by the user.

The controller 920 transmits the extracted characteristic information to the external device that is connected to the content-collecting apparatus. When at least one extracted characteristic information is displayed by the display unit 910, the user may select at least one extracted characteristic information and may transmit the selected extracted characteristic information to the external device by using the communication unit 930. The controller 920 may transmit the selected characteristic information to the external device in a metadata format by using the communication unit 930. The communication unit 930 then receives content relating to the characteristic information from the external device. In the current embodiment, the content information may include at least one of the group consisting of a thumbnail of the content, address information regarding the content, such as a folder name in which a device and content are stored, and a filename of the content, and the like. The display unit 910 then displays the received content information. Moreover, the display unit 910 may display all or selected content according to the type of the received content, for example, a photo, music, a video, news, a TV channel, or the like.

The controller 920 requests for content corresponding to content information selected according to a selection of a user to an external device by using the communication unit 930. For example, when a user selects content information displayed on a screen of the apparatus and moves the selected content information to a desired device displayed on the screen (for example, drag and drop), the controller 920 requests for content corresponding to the selected content information to the device by using the communication unit 930. When the external device is requested by the content-collecting apparatus to receive characteristic information and to provide content, the external device extracts content relating to the received characteristic information and transmits the extracted content to the content-collecting apparatus. A condition by which a device functions as the external device may include cases where power of the device is turned on (also applies to the case where power is turned off according to a user's intention), the device is connected to the content-collecting apparatus via a network, data transmission and sharing of the device have been already authorized, and software only for performing methods relating to the above cases is installed, for example.

The communication unit 930 receives the requested content, and the controller 920 may store the content in a device or location that is selected by the user.

The storage unit 940 stores already-stored content, content information that is received from the external device, content that is received from the external device, and an application (a program or software) relating to a method of collecting content.

In another embodiment, the apparatus 900 for collecting content may collect content (for example, a photo or video) relating to date, location, event, and a name of a person that are made in a schedule that is being managed by the user and may constitute a group (album) according to events.

Further, in another embodiment, when the type of content is music, the apparatus 900 for collecting content may receive preferred music that is stored in an external device that is connected to the content-collecting apparatus, may create a playlist automatically according to priority and may listen to the music by sharing another person's music preference.

In another embodiment, when current content is not being displayed but a file browser is being displayed, the apparatus 900 for collecting content analyzes a common characteristic of content included in the file browser and provides situation information based on the common characteristic. The external device provides the result of analyzing highlighted content of the list. As a result, all content may be collected regardless of the types of the content.

In another embodiment, when the content is personal information regarding a device and device menu information, such as a setting menu screen or the like, the apparatus 900 for collecting content analyzes and provides information that may be used as situation information in a current state. The apparatus 900 for collecting content provides a list of connected devices to an external device. When the user selects a device of which a setting state is to be shared, the apparatus 900 for collecting content shares setting information with connected devices, i.e., synchronizes a setting state with the connected devices.

As described above, in a method and content-collecting apparatus, according to the one or more embodiments of the present invention, a plurality of devices may easily be connected to one another by using an intuitive method whereby device being used is adjacent to another device, and content relating to the plurality of connected devices is collected according to characteristics and usage situations of the content that is seen by the user through the current device. Thus, the user may collect only desired information by connecting the content-collecting apparatus at a desired time. That is, the content may be collected from two or more devices that are connected by being adjacent to each other based on characteristics and usage situations of the content that is being used, and the desired content may be used and stored so that the user may manage the content conveniently.

Thus, when a large amount of content is widely distributed to various devices, a user is able to easily search, collect, and manage desired content according to a result of analysis of characteristics and usage situations of the content.

The invention can also be embodied as computer-readable codes on a computer-readable recording medium. The computer-readable recording medium is any data storage device that can store data that can be thereafter read by a computer system. Examples of the computer-readable recording medium include Read-Only Memory (ROM), Random-Access Memory (RAM), CD-ROMs, magnetic tapes, floppy disks, optical data storage devices, and the like. The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

While this invention has been particularly shown and described with reference to embodiments thereof, it will be understood by those skilled in the art that various changes in form and details may be made therein without departing from the spirit and scope of the invention as defined by the appended claims and their equivalents.

What is claimed is:

1. A method of collecting content by a content-collecting apparatus, the method comprising:
    extracting characteristic information from content that is being displayed;
    displaying a list of the extracted characteristic information;
    receiving a user input to select at least one piece of the extracted characteristic information in the displayed list;
    recognizing an external device that is in a predetermined range from the content-collecting apparatus;
    transmitting the selected characteristic information which is extracted from the content to the external device; and
    receiving at least one related content relating to the selected characteristic information from the external device,
    wherein receiving the at least one related content comprises:
    receiving at least one thumbnail image corresponding to the at least one related content from the external device and displaying the at least one thumbnail image;
    requesting related content corresponding to a selected thumbnail image which is selected, by a user, from the displayed at least one thumbnail image; and
    receiving the requested related content from the external device.

2. The method of claim 1, further comprising receiving at least one of a thumbnail of address information regarding the content and a filename of the content with the at least one thumbnail image.

3. The method of claim 1, further comprising displaying the external device that is connected to the content-collecting apparatus on a screen.

4. The method of claim 1, wherein the content comprises at least one of a photo, music, a video, news information, TV program information, a schedule of a user, an address book of the user, and information regarding the setting state of a device including the content-collecting apparatus.

5. The method of claim 1, wherein the characteristic information is extracted from metadata included in the content.

6. The method of claim 1, wherein extracting the characteristic information from content that is being displayed includes extracting the characteristic information from the content that is being displayed according to a mode of the content that is being displayed.

7. The method of claim 1, wherein extracting the characteristic information from content that is being displayed includes extracting the characteristic information from the content that is being displayed according to a predetermined condition.

8. The method of claim 1, wherein recognizing the external device comprises recognizing the external device that is in a predetermined range from the content-collecting apparatus via a first network; and
    the method further comprising: connecting the recognized external device to the content-collecting apparatus via a second network.

9. The method of claim 8, wherein the first network includes at least one of a ZigBee communication network and a Bluetooth communication network, and the second network includes a Wireless Local Area Network (WLAN).

10. A content-collecting apparatus, the apparatus comprising:
    a controller configured to extract characteristic information from content that is being displayed, display a list of the extracted characteristic information on a display, and receive a user input to select at least one piece of the extracted characteristic information in the displayed list; and
    a communication unit configured to recognize an external device that is in a predetermined range from the content-collecting apparatus, transmit the selected characteristic information which is extracted from the content to the external device, and receive at least one related content relating to the selected characteristic information from the external device,
    wherein the communication unit is further configured to receive at least one thumbnail image corresponding to the at least one related content from the external device,
    the controller is further configured to display the at least one thumbnail image on the display, and request related content corresponding to a selected thumbnail image which is selected, by a user, from the displayed at least one thumbnail image, and
    the communication unit is further configured to receive the requested related content from the external device.

11. The apparatus of claim 10, wherein the communication unit is further configured to receive at least one of a address information regarding the content and a filename of the content with the at least one thumbnail image.

12. The apparatus of claim 10, wherein the controller is further configured to display the external device that is connected to the content-collecting apparatus on the display.

13. The apparatus of claim 10, wherein the content comprises at least one of a photo, music, a video, news information, TV program information, a schedule of a user, an address book of the user, and information regarding the setting state of a device including the content-collecting apparatus.

14. The apparatus of claim 10, wherein the characteristic information is extracted from metadata included in the content.

15. The apparatus of claim 10, wherein the controller extracts the characteristic information according to a mode of the content that is being displayed.

16. The apparatus of claim 10, wherein the controller extracts the characteristic information according to a predetermined condition.

17. The apparatus of claim 10, wherein the communication unit is further configured to recognize the external device via a first network, and connect the recognized external device to the content-collecting apparatus via a second network.

18. The apparatus of claim 17, wherein the first network includes at least one of the group consisting of a ZigBee communication network and a Bluetooth communication network, and the second network includes a Wireless Local Area Network (WLAN).

* * * * *